UNITED STATES PATENT OFFICE.

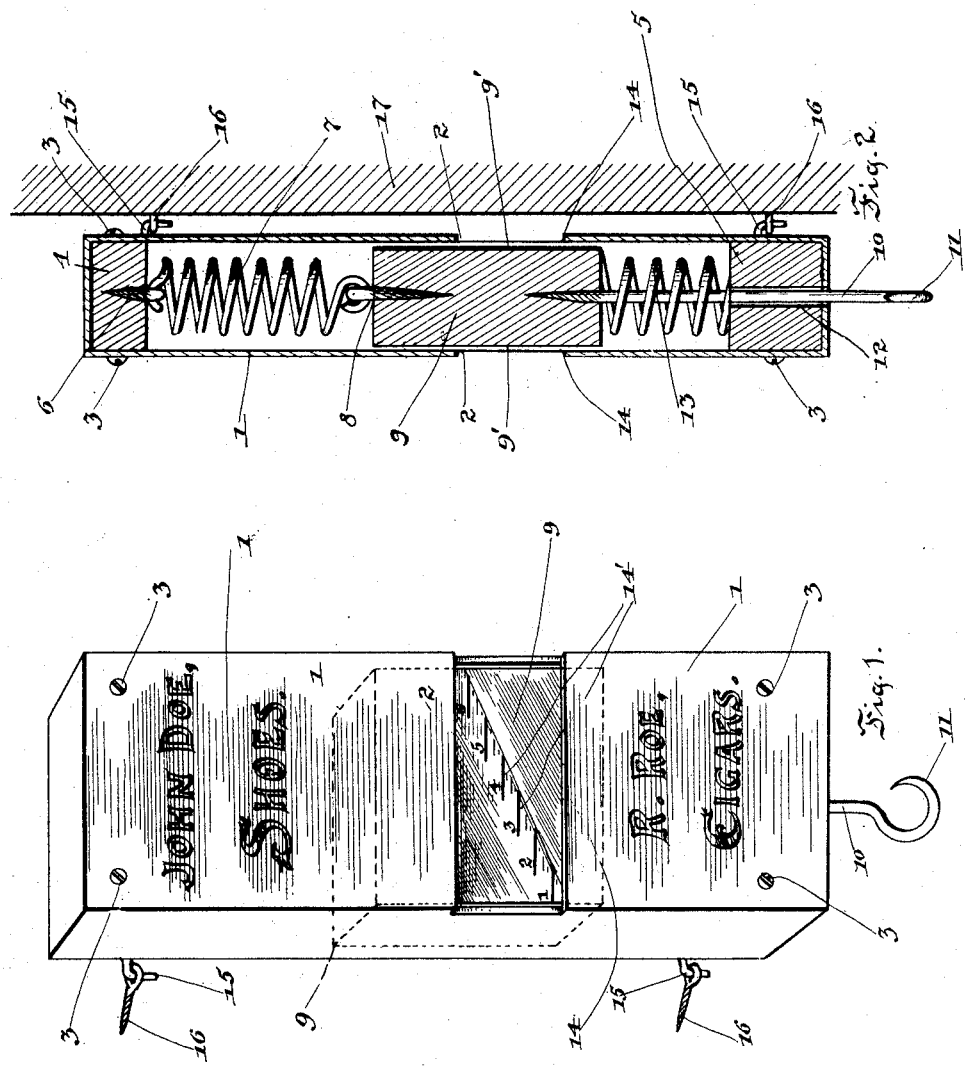

CHARLES H. COLSON, OF SHELDAHL, IOWA.

SPRING-SCALE.

984,264.  Specification of Letters Patent.  Patented Feb. 14, 1911.

Application filed June 8, 1910. Serial No. 565,707.

*To all whom it may concern:*

Be it known that I, CHARLES H. COLSON, a citizen of the United States, residing at Sheldahl, county of Polk, and State of Iowa, have invented certain new and useful Improvements in Spring-Scales, of which the following is a specification.

My invention relates to improvements in spring scales, the object of the invention being the production of a spring scale which shall be so designed as to be capable of serving as an advertising medium as well as for weighing purposes.

A further object of my invention is to provide a device of the character stated which shall be simple of construction, inexpensive to manufacture, strong and durable, and efficient in operation.

Other objects will appear hereinafter.

With these objects in view my invention consists in the novel construction and arrangement of parts which will be hereinafter fully described and more particularly pointed out in the appended claims.

My invention will be more readily understood by reference to the accompanying drawing forming a part of this specification, and in which, Figure 1 is a perspective view of my improved spring scale in its preferred form, and Fig. 2 is a central vertical section thereof.

The preferred form of my invention as illustrated in the drawing comprises a rectangular sheet metal casing 1 having openings 2 in the opposite sides thereof. Secured by means of screws 3 and in the interior of the casing at the top and bottom thereof are wooden blocks 4 and 5 respectively. A screw-eye 6 is screwed into the block 4, and suspended therefrom is a tension helical spring 7 the lower end of which engages a screw-eye 8 screwed into the vertically slidable block 9. A rod 10 having a hook 11 at its lower extremity is screwed into the under side of the block 9 as shown in Fig. 2, the elongated perforation 12 being provided in the block 5 which serves as a guide for said rod. Interposed between the blocks 5 and 9 is a compression helical spring 13 which coöperates with the spring 7 for weighing articles attached to the hook 11. The opposite faces 9' of the block 9 are graduated as shown in Fig. 1, so that when said block is drawn downwardly by the weight of an article suspended from the hook 11 the weight of the article can be determined by the graduations 14' registering with the edge 14. For instance, if an article weighs five pounds, the horizontal graduations adjacent the numeral five will register with the edge 14, the latter being disposed horizontally and the line of graduations being inclined thereto.

Hinges 15 comprising screw-eyes 16 are provided so that the device may be attached to a wall 17 and be adapted to fold thereagainst when not in use. The spaces above and below the openings 2 are available for advertising purposes as shown in Fig. 1.

While I have shown what I deem to be the preferable form of my improved spring scale I do not wish to be limited thereto as there might be various changes and modifications made in the details of construction and arrangement of parts described, and hence I desire to avail myself of such variations and modifications as will fairly fall within the spirit and scope of the appended claims.

Having described my invention what I claim as new and desire to secure by Letters Patent is:

1. In a spring scale, a rectangular casing having sight openings in opposite sides thereof; a block slidable in said casing and having weight graduations on opposite sides thereof and visible through said openings; a spring supporting said block; and suspension means attached to said block and depending from said casing, substantially as described.

2. In a spring scale, a rectangular casing having sight openings in opposite sides thereof; a block slidable in said casing and having weight graduations on opposite sides thereof and visible through said openings; a spring supporting said block; suspension means attached to said block and depending from said casing; and a hinged support for said casing, substantially as described.

3. In a spring scale, a rectangular casing having blocks secured therein at the top and bottom thereof, a tension helical spring suspended from the top block and a compression helical spring supported by the bottom block, a vertically slidable block interposed between said springs and suspended from the first-named spring, there being opposite openings in said casing which render two opposite faces of said slidable block visible, graduations on said faces adapted to register with the lower edge of said openings, and a hooked rod secured to said slidable block passing through an elongated perforation or guide provided in said bottom block, substantially as described.

4. In a spring scale, a casing having blocks secured therein at the top and bottom thereof, a tension helical spring suspended from the top block and a compression helical spring supported by the bottom block, a vertically slidable block interposed between said springs and suspended from the first-named spring, there being opposite openings in said casing which render two opposite faces of said slidable block visible, graduations on said faces adapted to register with the lower edge of said openings, a rod provided with a hook at its lower extremity secured to said slidable block and passing through an elongated perforation or guide provided in said bottom block, and means for hinging said casing to a wall or other support, said lower edge being disposed horizontally and said graduations being in a line inclined thereto.

In testimony whereof I have signed my name to this specification in the presence of two subscribing witnesses.

CHARLES H. COLSON.

Witnesses:
 HELEN F. LILLIS,
 JOSHUA R. H. POTTS.